United States Patent
Tsui (10) Patent No.: US 10,226,108 B2
(45) Date of Patent: Mar. 12, 2019

(54) COLLAPSIBLE CONTAINERS

(71) Applicant: Sam Tung Tsui, Kowloon (HK)

(72) Inventor: Sam Tung Tsui, Kowloon (HK)

(\*) Notice: Subject to any disclaimer, the term of this patent is extended or adjusted under 35 U.S.C. 154(b) by 637 days.

(21) Appl. No.: 14/247,962

(22) Filed: Apr. 8, 2014

(65) Prior Publication Data

US 2015/0250277 A1 Sep. 10, 2015

(30) Foreign Application Priority Data

Mar. 10, 2014 (DE) .................... 20 2014 101 046 U (51) Int. Cl.
| | |
|---|---|
| *A45C 7/00* | (2006.01) |
| *A45C 5/14* | (2006.01) |
| *B29C 45/14* | (2006.01) |
| *B29C 45/16* | (2006.01) |
| *B32B 37/12* | (2006.01) |
| *B29L 31/00* | (2006.01) |

(52) U.S. Cl.
CPC ............ *A45C 7/0022* (2013.01); *A45C 5/146* (2013.01); *A45C 7/0027* (2013.01); *B29C 45/14* (2013.01); *B29C 45/1671* (2013.01); *B32B 37/1284* (2013.01); *B29L 2031/7128* (2013.01); *B32B 2439/46* (2013.01); *Y10T 29/49877* (2015.01)

(58) Field of Classification Search
CPC ....... A45C 7/0022; A45C 5/14; A45C 7/0063; A45C 7/0031; A45C 7/0027; A45C 5/146
USPC ....... 190/100, 103; 280/30, 47.26, 641, 655; 150/106; 220/592.03, 592.2
See application file for complete search history.

(56) References Cited

U.S. PATENT DOCUMENTS

| | | | |
|---|---|---|---|
| 1,724,743 A | 8/1929 | Allen | |
| 2,899,110 A | 8/1959 | Parker | |
| 5,384,138 A | 1/1995 | Robbins, III et al. | |
| 5,900,293 A | 5/1999 | Zettle | |
| 6,354,456 B2 | 3/2002 | Rapson | |
| 6,705,471 B2 | 3/2004 | Kataoka | |
| 6,736,285 B2 | 5/2004 | Stewart-Stand | |
| D574,673 S | 8/2008 | Tsui | |
| 7,654,402 B2 | 2/2010 | Kusuma et al. | |
| 7,678,271 B2 | 3/2010 | Curtin | |
| D615,826 S | 5/2010 | Tsui | |
| 7,819,263 B1 | 10/2010 | DiCarlo-Nelson | |
| D656,800 S | 4/2012 | Lee et al. | |
| D658,949 S | 5/2012 | Tsui | |
| 8,215,230 B2 | 7/2012 | Curtin | |
| D692,715 S | 11/2013 | Tsui | |
| 8,887,942 B2 | 11/2014 | Miksovsky et al. | |
| D724,905 S | 3/2015 | Tsui | |
| 9,044,082 B2 | 6/2015 | Kusuma et al. | |
| D749,373 S | 2/2016 | Tsui | |

(Continued)

OTHER PUBLICATIONS

Normann Copenhagen, Strainer blue, Funnel & Strainer, 6 pages, visited Dec. 19, 2013, available at <http://www.normann-copenhagen.com/products/strainer>.

*Primary Examiner* — Fenn C Mathew
*Assistant Examiner* — Cynthia Collado
(74) *Attorney, Agent, or Firm* — Hinshaw & Culbertson LLP (57) ABSTRACT

Collapsible portable containers having a foldable wall section with shape-retaining characteristics are disclosed. In particular, collapsible, wheeled suitcases and trolleys are provided. One or more casters of a collapsible suitcase may be retractable to permit a folding region of a wall section to overlap the depth dimension of the casters when in the collapsed position. The folding region may include foldable tiers of a flexible material, each tier having at least one stable, relatively expanded position and at least one stable, relatively collapsed position; and an intervening, non-folding tier. The non-folding tier may be of the same material as the flexible tiers but stiffer due to its geometry, or it may be composed of a different, relatively rigid material.

21 Claims, 9 Drawing Sheets

(56) References Cited

U.S. PATENT DOCUMENTS

| | | | |
|---|---|---|---|
| 2006/0096929 A1 | 5/2006 | Repp et al. | |
| 2007/0023439 A1* | 2/2007 | Vaughn | F25D 3/08 220/592.03 |
| 2007/0290466 A1* | 12/2007 | Lenz | B62B 3/12 280/47.26 |
| 2009/0032153 A1* | 2/2009 | Burnett | A45C 5/005 150/106 |
| 2009/0050429 A1* | 2/2009 | Adams, Jr. | A45C 13/02 190/109 |
| 2011/0248037 A1 | 10/2011 | Fung | |
| 2011/0272419 A1 | 11/2011 | Vanderberg et al. | |
| 2012/0205371 A1 | 8/2012 | Lee | |
| 2013/0206800 A1* | 8/2013 | Simonsen | A45F 5/00 224/148.3 |
| 2013/0277364 A1* | 10/2013 | Kusuma | A45F 3/20 220/8 |
| 2014/0238801 A1* | 8/2014 | Lai | A45C 7/0031 190/105 |
| 2015/0251795 A1* | 9/2015 | Tsui | A45C 7/0031 215/306 |
| 2015/0251808 A1 | 9/2015 | Tsui | |
| 2015/0253055 A1* | 9/2015 | Tsui | B65D 21/086 62/62 |
| 2015/0291309 A1 | 10/2015 | McGregor | |
| 2015/0320165 A1* | 11/2015 | Chi Yueh Chen | A45C 7/0054 190/18 A |
| 2016/0262511 A1* | 9/2016 | Lusson | A45C 5/03 |
| 2016/0347503 A1 | 12/2016 | Tsui | |

* cited by examiner

COLLAPSIBLE CONTAINERS

CROSS REFERENCE TO RELATED APPLICATIONS

This application claims priority under 35 U.S.C. § 119 to German patent application DE 20 2014 101 046.7, filed Mar. 10, 2014, the entire contents of which are incorporated herein by reference.

FIELD OF THE INVENTION

The present invention relates to shape-retaining, collapsible, portable containers, including suitcases and trolleys.

BACKGROUND OF THE INVENTION

It is desirable for a luggage item to be able to collapse to relatively compact dimensions for storage or transport when the luggage item is either not in use or being used to hold less than its maximum volume capacity of contents. Collapsible luggage of various kinds exist to accommodate these general needs. However, multiple challenges are inadequately addressed by existing collapsible luggage.

In particular, existing collapsible luggage, while capable of expanding to the volume of contents held therein, generally collapses to its more compact shape when empty. For example, "duffel bags," typically composed of a flexible fabric material such as canvas or nylon on most or all sides, limply collapse flat or nearly flat when empty, thus making them awkward to pack compared to their hard-bodied counterparts, as the available height dimension does not become visually apparent until packing has already begun, and moreover, a packer often will have to use one hand to hold the bag open while inserting contents with the other hand. Also, a duffel bag typically provides little or no structural rigidity to protect its contents.

On the other hand, some existing suitcases feature one or more zippered expansion panels for selectively permitting the interior volume to expand by opening a zipper to allow the panel to stretch or unfold to its maximum width. In a common type of wheeled carry-on suitcase, such zippered expansion panels provide a selectively expandable dimension between a pivotally opening front closure panel and a back section which is typically permanently attached to a relatively stiff or rigid peripheral wall section. However, the expansion panel itself is typically made of a limp fabric that is incapable of passively retaining its expanded state, but rather would collapse under its own weight and/or the weight of one or more portions of the suitcase positioned above the expansion panel when the suitcase is laid out on its back panel for packing/loading. Additionally, such an expansion panel provides little to no resistance to deformation except in tension, and thus little to no protection of suitcase contents against side impacts, for example.

A need therefore exists for suitcases and other transportable and fully closable containers that are collapsible and expandable; self-supporting in at least a fully collapsed and a fully expanded state, if not in one or more intermediate, partially expanded states; and intrinsically resistant to compressive deformation over at least a portion of a collapsible wall region.

BRIEF SUMMARY OF THE INVENTION

According to one aspect of the invention, a collapsible suitcase is provided, comprising a front section; a back section; and a collapsible wall section connecting the front section to the back section, the collapsible wall section including at least three stacked, generally annular tiers. In the context of the present invention, "collapsible" means "collapsible and expandable;" that is, the containers of the invention can be collapsed from a relatively expanded state and expanded from a relatively collapsed state, and these operations can preferably be repeated a large number of times without any substantial change in the response of the container to each successive cycle of collapsing and expanding. Advantageously, the front and back sections may be composed of a relatively hard, rigid material to help protect and maintain the order of the contents of the suitcase. The front and back sections optionally but preferably include a generally flat front and back panel, respectively. The front and back sections may alternatively include contoured front and/or back surfaces as desired. One or both of the front and back sections may also include a peripheral wall portion that surrounds the flat panel and extends toward the opposite panel to form a part of the overall wall structure of the suitcase. The front section and back section are not defined by their particular shape, but rather by cooperating with the collapsible wall structure to enclose a storage volume. In this context, "enclosed" does not necessarily mean totally devoid of perforations or openings, but rather enclosed to a degree that a traveler would normally find sufficient for suitcase purposes.

At least one of the tiers of the collapsible wall section is relatively stiff, with at least one neighboring flexible tier disposed both in front of and behind (i.e., above and below, when the suitcase is placed on its back side for packing) the stiff tier. Thus, the size of the storage volume can be increased, by expanding or unfolding at least one of the flexible tiers from a relatively collapsed to a relatively expanded position; and decreased, by folding at least one of the flexible tiers from a relatively expanded to a relatively collapsed position. The stiff tier is preferably a rigid tier made of a different, harder material than the flexible tiers. Alternatively, it may be made of the same material and simply be thicker or otherwise geometrically shaped or oriented to have greater resistance to folding or inverting than the flexible tiers.

Preferably, the flexible tiers, despite being flexible enough to fold under a reasonable amount of manually applied force, are also stiff enough for the suitcase to be self-supporting when lying on its back side in any fully or relatively expanded state. On the other hand, the flexible tiers preferably do not have a tendency to snap back to an expanded/unfolded position once collapsed/folded, but rather exhibit "over-center" stability, being biased toward a folded position once folded past a certain threshold point, and biased toward an unfolded position once unfolded past a certain threshold point.

Preferably, to facilitate snap-through movement between the folded and unfolded states, each flexible tier is provided with two living hinges comprising very narrow annular bands of flexible material, at which the material suddenly tapers down to a sharply reduced thickness, at the front and rear ends of the flexible tier. Beyond the ends of the flexible tier, the material tapers back out to an increased thickness, and a wider band of the flexible material of increased thickness is disposed between each living hinge and the adjacent rigid tier of a different material, where applicable. In addition to facilitating snap-through movement between states, the thinned regions also permit each flexible tier to fold more compactly against adjacent tiers, promote stability in the folded state by minimizing forces tending to straighten the material at the bent region, and promote the formation of a folded crease at a precise, consistent location each time the tier is folded.

If the stiff tier is a rigid tier made of a different material than the flexible tiers, the rigid tier may, for example, be polypropylene (or "PP"), with the adjacent flexible tiers being a thermoplastic elastomer (or "TPE") overmolded onto the polypropylene. Alternatively, the rigid tier may, for example, be composed of metal or nylon, and the flexible tier of silicone that is overmolded onto the metal or nylon, the silicone tier being connected to the metal or nylon tiers with or without an adhesive between them to strengthen their connection. Although not illustrated in the figures, other suitable means for joining together rigid and flexible tiers may be employed, including mechanical fasteners.

Where the front section includes a front panel, the front panel is preferably connected by a pivotal joint extending along a generally straight portion of the perimeter of the suitcase, and a zipper extending at least part of the rest of the way around the suitcase. The zipper and pivotal joint should be relatively situated so that when the zipper is fully opened, the front panel is free to pivot open, and when the zipper is fully closed, the front panel cannot pivot open. Preferably, the suitcase also includes a lock to prevent the zipper from being opened, such as one that retains a pair of zipper pulls in fixed positions next to each other, as in the illustrated embodiment.

An alternative or second possible location for a zipper is within the stiff or rigid tier of the collapsible wall section. If such a zipper is included, the stiff or rigid tier may include two separate annular stiff or rigid bands connected to each other by a pivotal joint and a zipper, substantially in the manner described above for the front-panel. The suitcase also preferably includes other features typical of a travel suitcase, such as casters and an extendable handle for rolling the suitcase across a floor surface.

According to another aspect of the invention, collapsible trolleys similar to the collapsible suitcases are provided. The collapsible trolleys differ from the collapsible suitcases primarily in that they include a pivoting lid closure instead of a zippered panel, which may for example snap closed over an upper rim of the trolley container body. This advantageously facilitates uses of the trolley that require frequent opening and closing, compared to the zippered closure typical of the suitcase.

DETAILED DESCRIPTION OF THE INVENTION

Collapsible containers with improved shape retention and structural integrity provided by the present invention are described herein. In particular, fully closable, collapsible containers especially suitable for use as suitcases and trolleys are described and illustrated with reference to FIGS. 1-15.

Figure 8A:
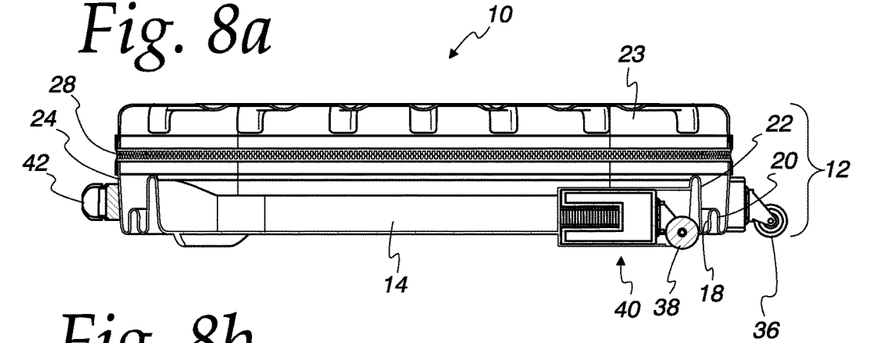
FIG. 8a is a sectional elevation view of the suitcase of FIG. 1 in a collapsed state.
Figure 8B:
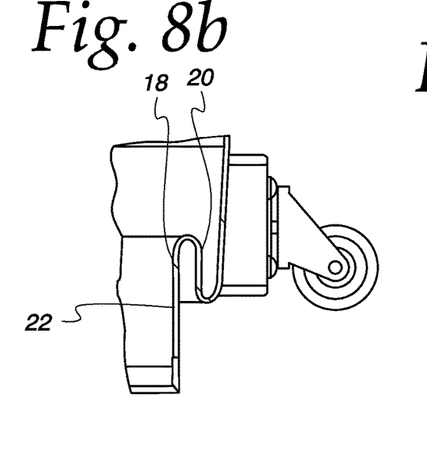
FIG. 8b is a fragmentary sectional elevation view of the suitcase of FIG. 1 depicting the collapsible wall section in a partially collapsed state.
Figure 8C:
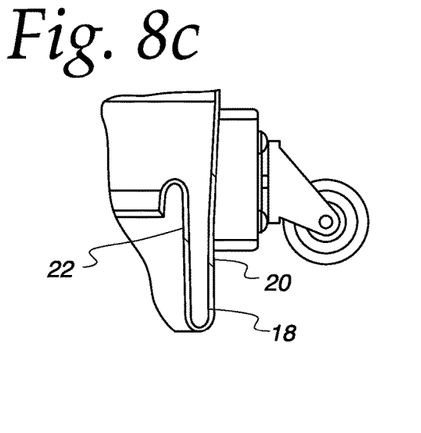
FIG. 8c is a fragmentary sectional elevation view of the suitcase of FIG. 1 depicting the collapsible wall section in another partially collapsed state.
Figure 9:
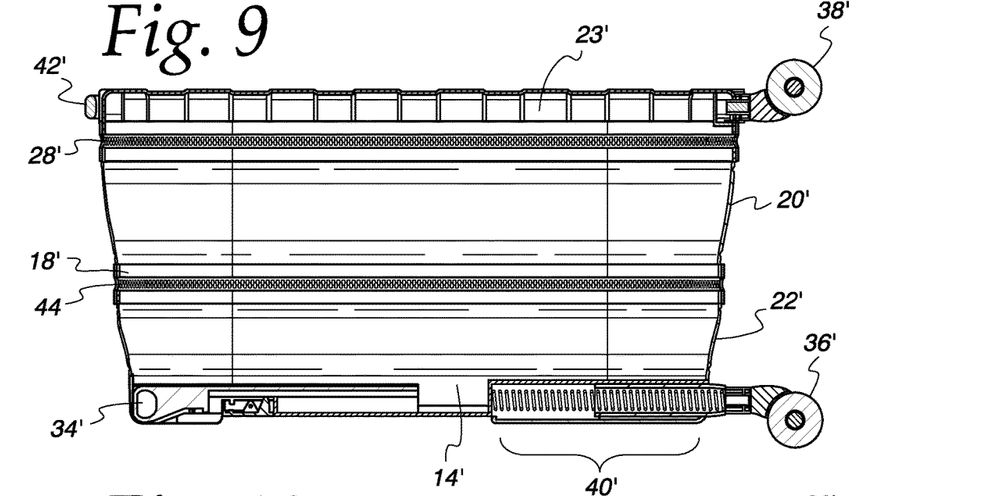
FIG. 9 is a sectional elevation view of the suitcase of FIG. 4 in an expanded state.
Figures 10A, 10B, 10C:
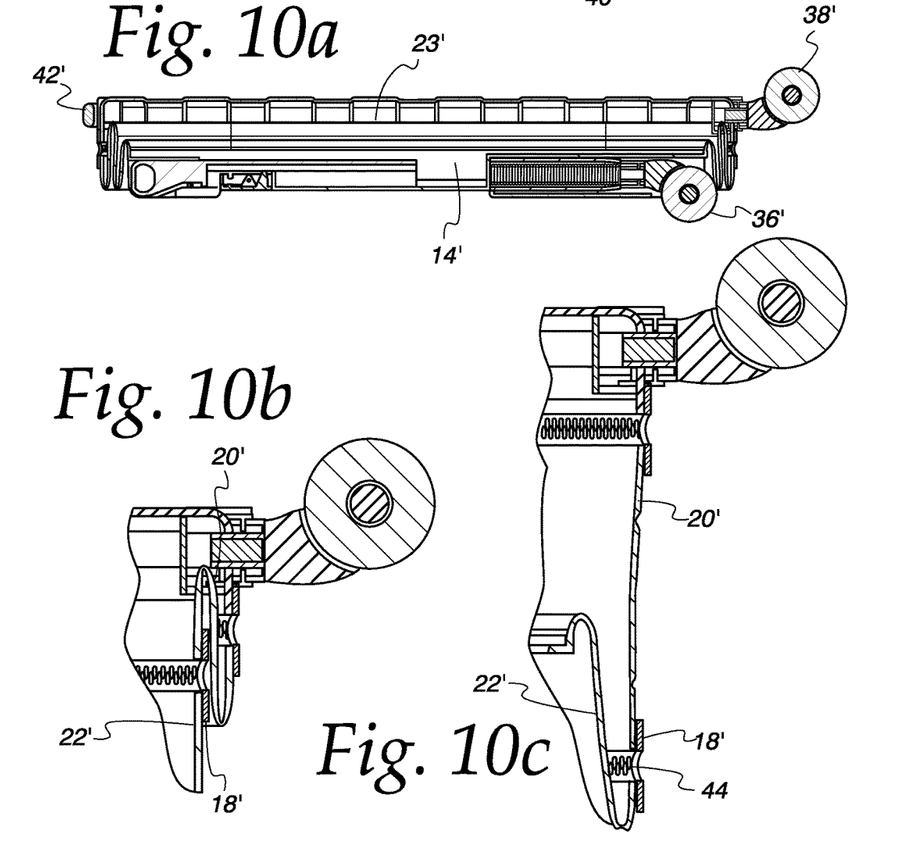
FIG. 10a is a sectional elevation view of the suitcase of FIG. 4 in a collapsed state.
FIG. 10b is a fragmentary sectional elevation view of the suitcase of FIG. 4 depicting the collapsible wall section in a partially collapsed state.
FIG. 10c is a fragmentary sectional elevation view of the suitcase of FIG. 4 depicting the collapsible wall section in another partially collapsed state.
Figure 11:
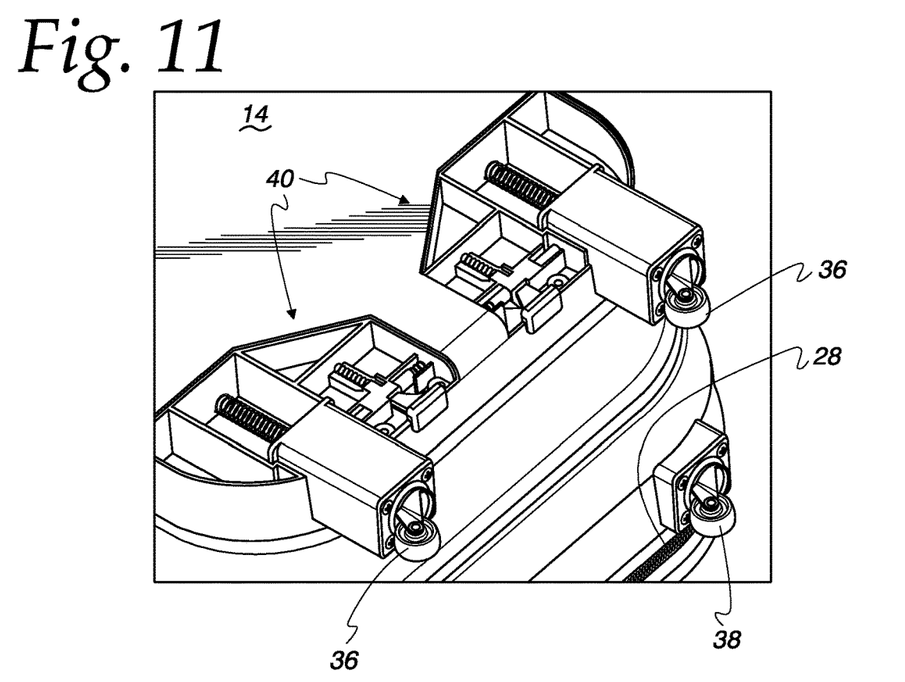
FIG. 11 is a cutaway perspective view of a retractable caster mechanism of the suitcase of FIG. 1 according to an aspect of the invention, depicting retractable casters in an extended position.
Figure 12:
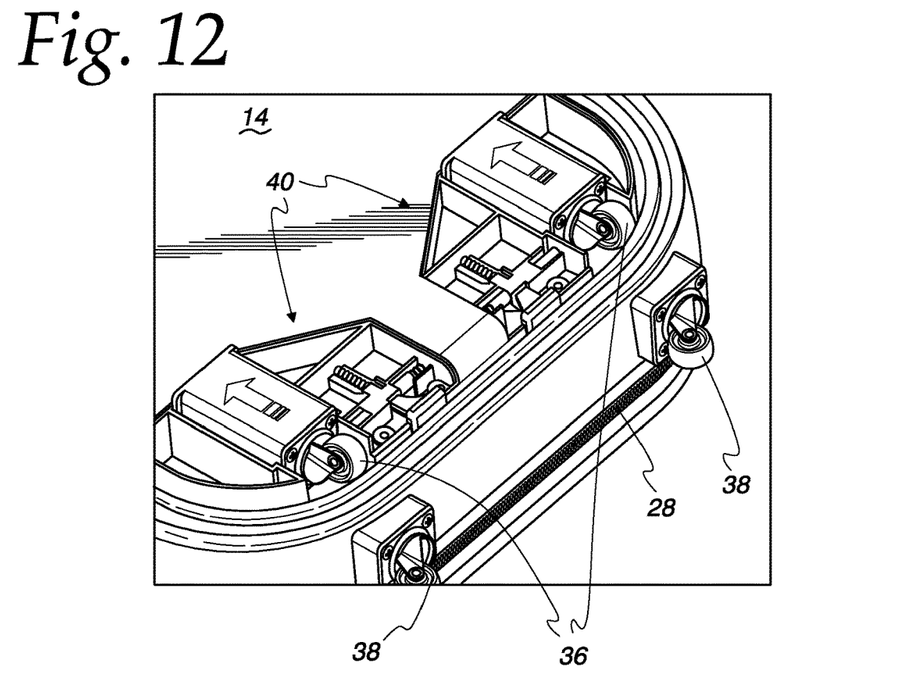
FIG. 12 is a cutaway perspective view of the retractable caster mechanism of FIG. 11, depicting retractable casters in a retracted position.
Figure 13:
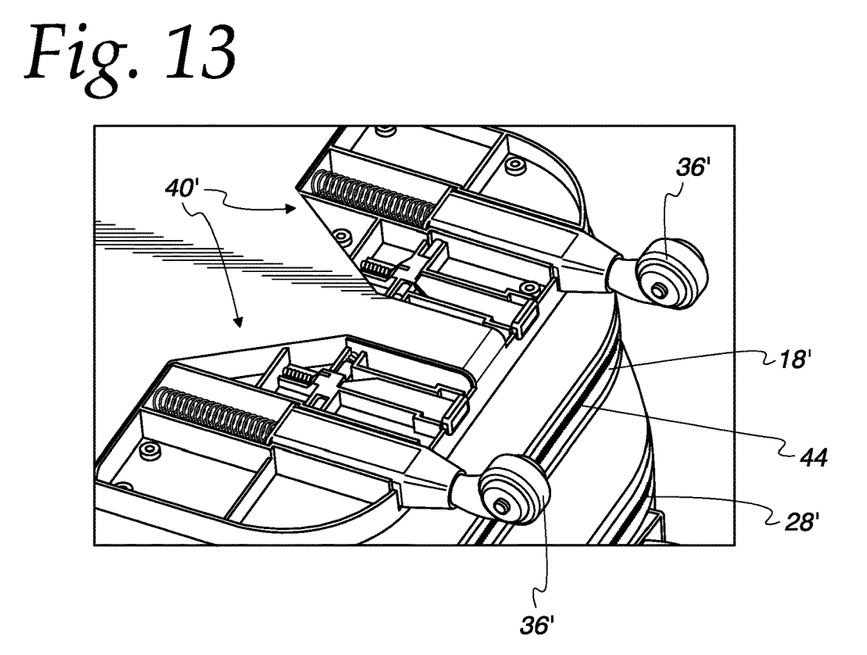
FIG. 13 is a cutaway perspective view of a retractable caster mechanism of the suitcase of FIG. 4 according to an aspect of the invention, depicting retractable casters in an extended position.
Figure 14:
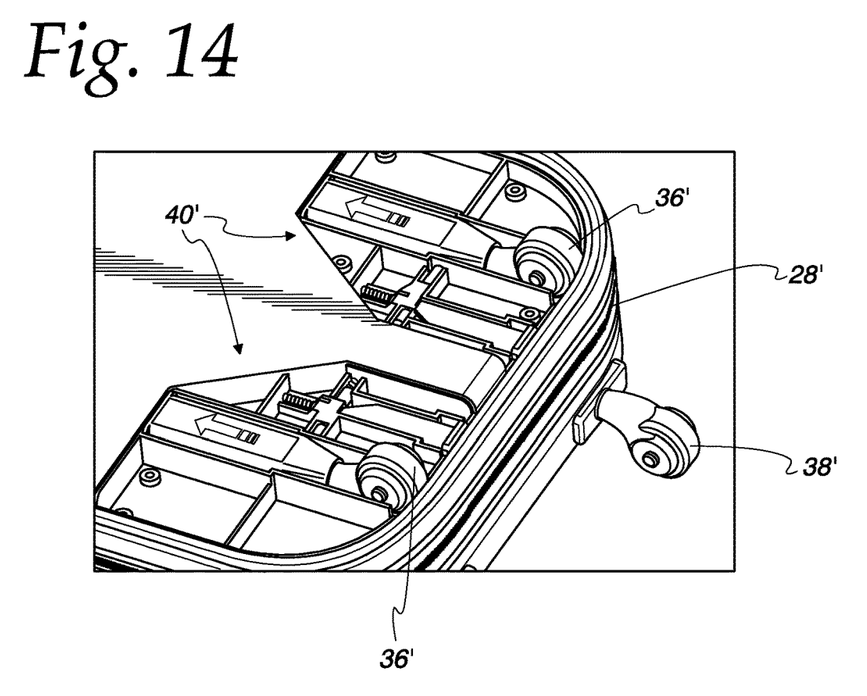
FIG. 14 is a cutaway perspective view of the retractable caster mechanism of FIG. 13, depicting retractable casters in a retracted position.

Turning to FIGS. 1-14, suitcases according to one embodiment of the invention are described and illustrated. Suitcase 10, depicted in FIGS. 1-3, 7, 8a-8c, 11, and 12, includes a hard front section 12, a hard back section 14, and a foldable wall section 16 that may be collapsed and expanded to vary the space between front section 12 and back section 14, and thus the available volume for packing contents into suitcase 10. Wall section 16, in turn, includes a stiff tier 18 between two flexible tiers 20 and 22. Flexible tiers 20 and 22 are illustrated as having two stable positions, one unfolded and one folded, respectively corresponding to relatively expanded and collapsed states of suitcase 10. A fully expanded state of suitcase 10 is illustrated in FIGS. 1, 3, 7, and 11, showing both flexible tiers 20 and 22 in unfolded positions, while a fully collapsed state of suitcase 10 is illustrated in FIGS. 2, 8a, and 12, showing both flexible tiers 20 and 22 in folded positions. Two partially collapsed states of suitcase 10 are illustrated in FIGS. 8b and 8c, in which only flexible tier 20 or only flexible tier 22 is folded, respectively. Thus, it is illustrated that each of flexible tiers 20 and 22 may be folded and unfolded separately and independently to transform the shape of suitcase 10 to its fully expanded, fully collapsed, and two partially expanded states illustrated in the Figures.

Of course, it will be understood that "stiff," "rigid," and "flexible" are relative terms. In the context of the present description of the invention, unless further specified, referring to a tier of a suitcase wall section as "stiff" simply means, at a minimum, that the tier is stiff enough to impart a force to its neighboring flexible tier or tiers sufficient to fold the flexible tier or tiers between relatively folded and unfolded stable positions (optionally causing the flexible tiers to "snap" between positions), without itself folding or inverting its orientation from front to rear, relative to the front and back sections of the suitcase. On the other hand, a tier that is considered "rigid" for purposes of the invention typically will not appreciably yield or deform, let alone fold, in the front-to-back direction of the force imparted to fold the flexible tiers, in response to either that force or other typical loads associated with normal use of the suitcase. Still further, a "rigid" tier preferably will not appreciably deform in any direction during normal use of the suitcase, thus providing protection to the contents against damage or disarray caused, for example, by side impacts or other lateral forces applied to wall section 16. A "rigid" tier that exhibits the latter characteristic of not appreciably deforming in any direction is typically formed of a different material than the flexible tiers, rather than the same material in a different size or geometric configuration.

Although each of flexible tiers 20 and 22 are shown as having only two stable positions, it is also within the scope of the invention to provide one or more flexible tiers having a plurality of stable partially expanded positions, for example by providing one or more flexible tiers having a stepped profile comprising a series of accordion-like pleats of flexible material, the pleats comprising peripheral bands of material oriented in alternating directions and connected to adjacent bands by living hinges (typically thinner or weakened regions made of the same material), so that each pleat can be independently folded and unfolded (not shown), being stable in either state. Also, a suitcase according to the invention need not have the generally rectangular peripheral shape of suitcase 10 as shown in the Figures, but may have any suitable shape, such as round, oval, or other shape as desired. In addition, the direction of expansion need not be normal to the front and back sections of a suitcase, but could be made to be at an oblique angle to the front and back sections as desired. For example, providing a slanted wall section, instead of the generally symmetrical wall section shown in the Figures, could permit the suitcase to expand in such an oblique direction. Furthermore, the path of expansion need not be straight, but could be curved as desired. For example, successive accordion pleats may be stable in relatively "bent" orientations, in which part of the peripheral or circumferential length of a pleat is folded and the remainder of the length is unfolded.

Figure 3:
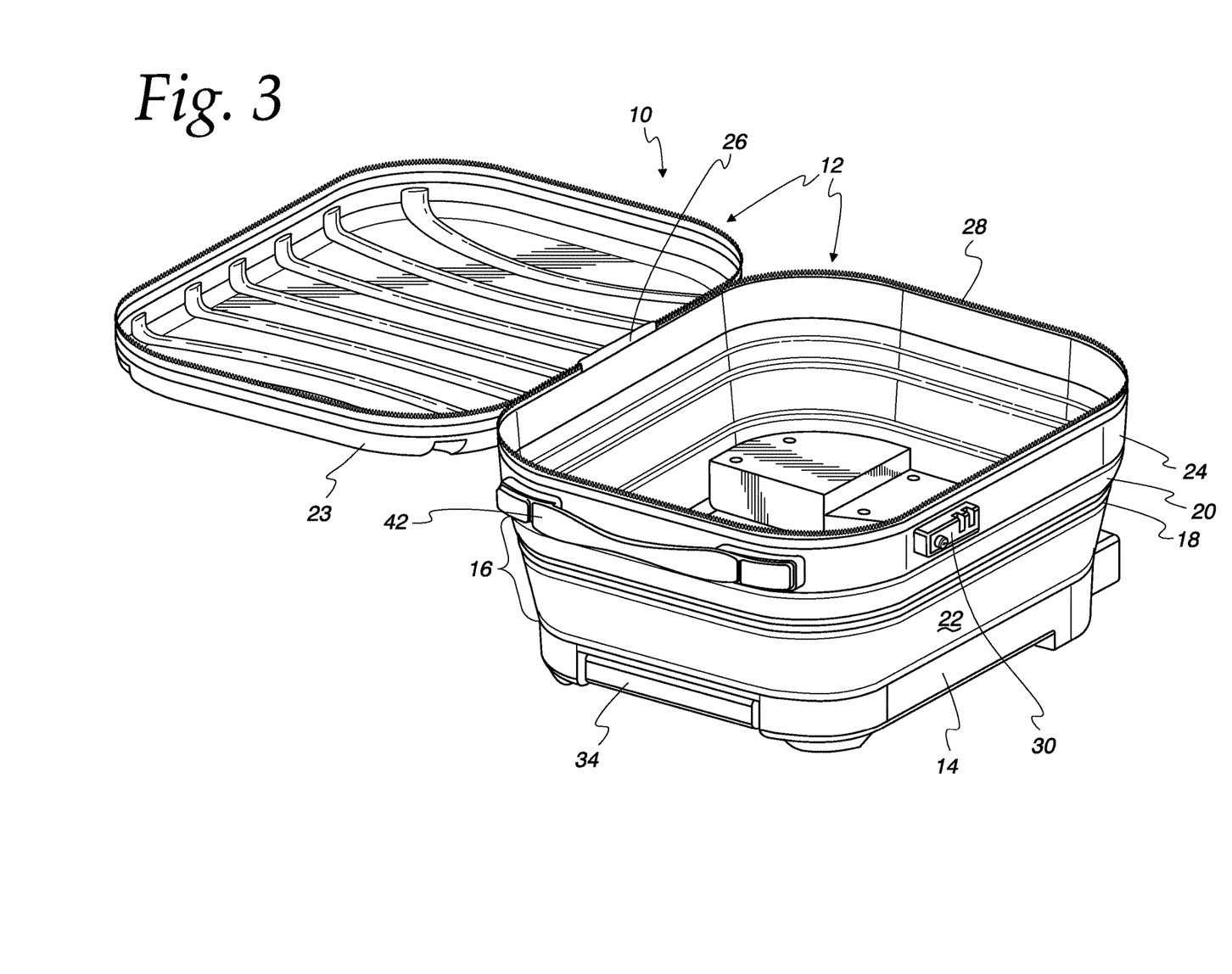
FIG. 3 is a perspective view of the suitcase depicted in FIG. 1 with its front panel opened.
Figure 4:
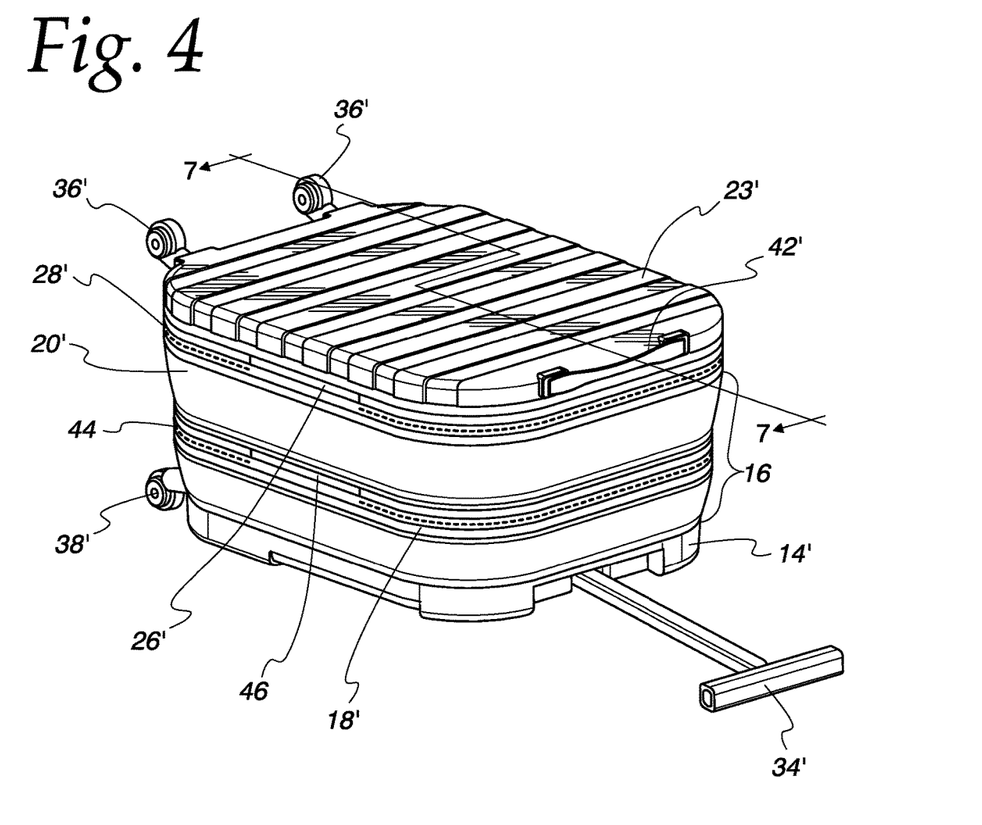
FIG. 4 is a perspective view of a suitcase according to an alternative embodiment, having a middle zipper.
Figure 5:
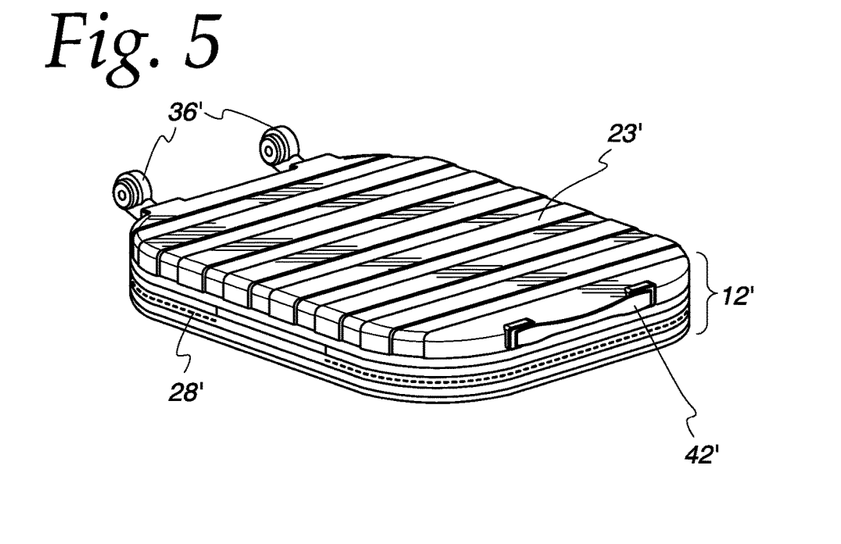
FIG. 5 is a perspective view of the suitcase of FIG. 4 in a collapsed state.

Front section 12 is shown in the Figures as comprising a front panel 23 connected to a rigid front wall section 24 by a hinge 26 and a front section zipper 28, thus permitting access to the interior of suitcase 10 by opening zipper 28 and pivoting front section 12 into the open position illustrated in FIG. 3. Alternatively, front section 12 may be secured by any suitable closure mechanism, including but not limited to clasps, latches, hooks, or straps (not shown). Optionally, a suitable locking mechanism, such as lock 30, which retains zipper pulls 32 in fixed positions when engaged, may be provided to secure the closure of suitcase 10.

Figure 1:
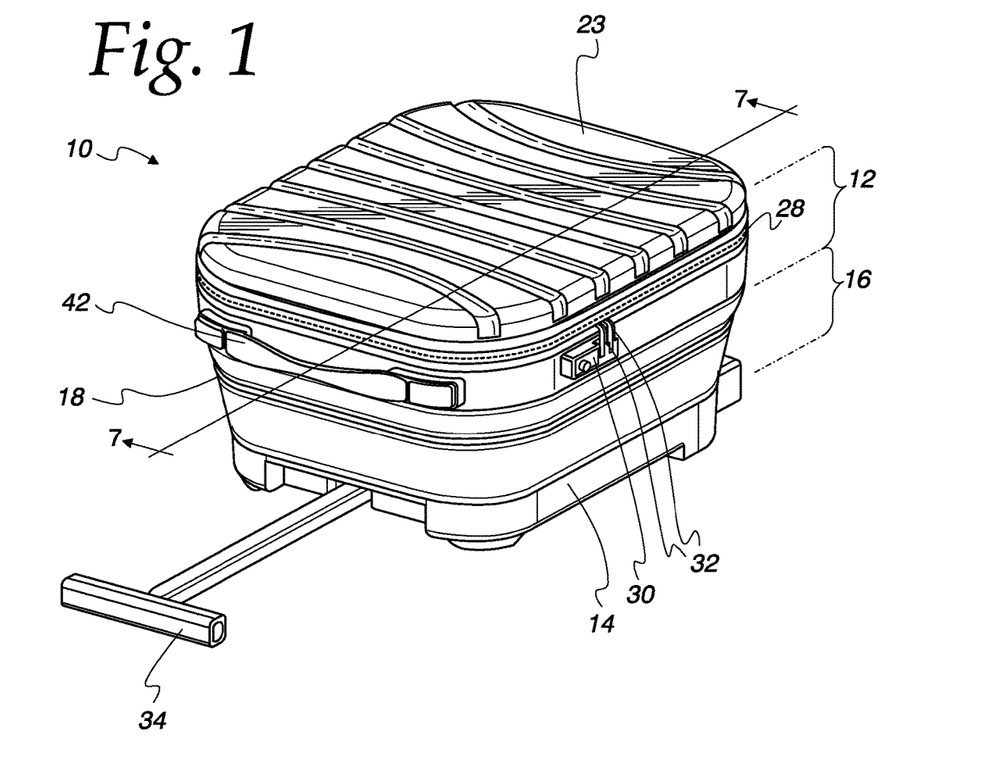
FIG. 1 is a perspective view of a suitcase according to one embodiment of the invention, in an expanded state.
Figure 2:
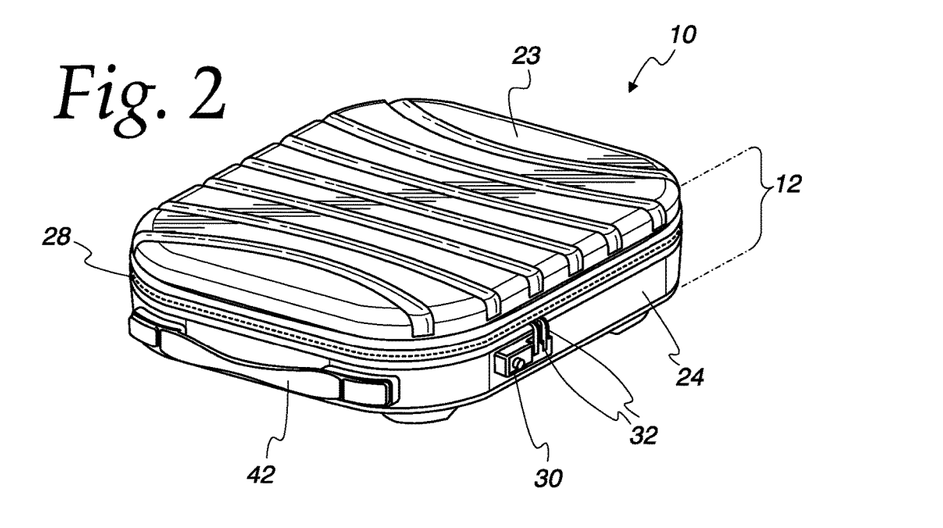
FIG. 2 is a perspective view of the suitcase depicted in FIG. 1, in a collapsed state.

To facilitate transport, suitcase 10 includes a suitable grasping means such as a retractable handle 34 connected to back section 14, as shown, for example, in FIG. 1, and casters 36, 38 for rolling suitcase 10 along a ground or floor surface. In the example of suitcase 10, casters 36 are fixedly attached to rigid front wall section 24. Advantageously, casters 38 are retractably mounted to back section 14 to permit casters 38 to be moved out of the way of the collapsing movement of wall section 16 for compact stowing of suitcase 10, as best illustrated in the cross-sectional elevation view of suitcase 10 depicted in FIG. 8a. A retractable mounting assembly 40 allowing casters 38 to be alternately locked in their extended and retracted positions is illustrated in FIGS. 7 and 8a-8c. A carrying handle 42 is also included in suitcase 10 for lifting and carrying suitcase 10 when rolling transport of suitcase 10 is not possible or not preferred.

Figure 6:
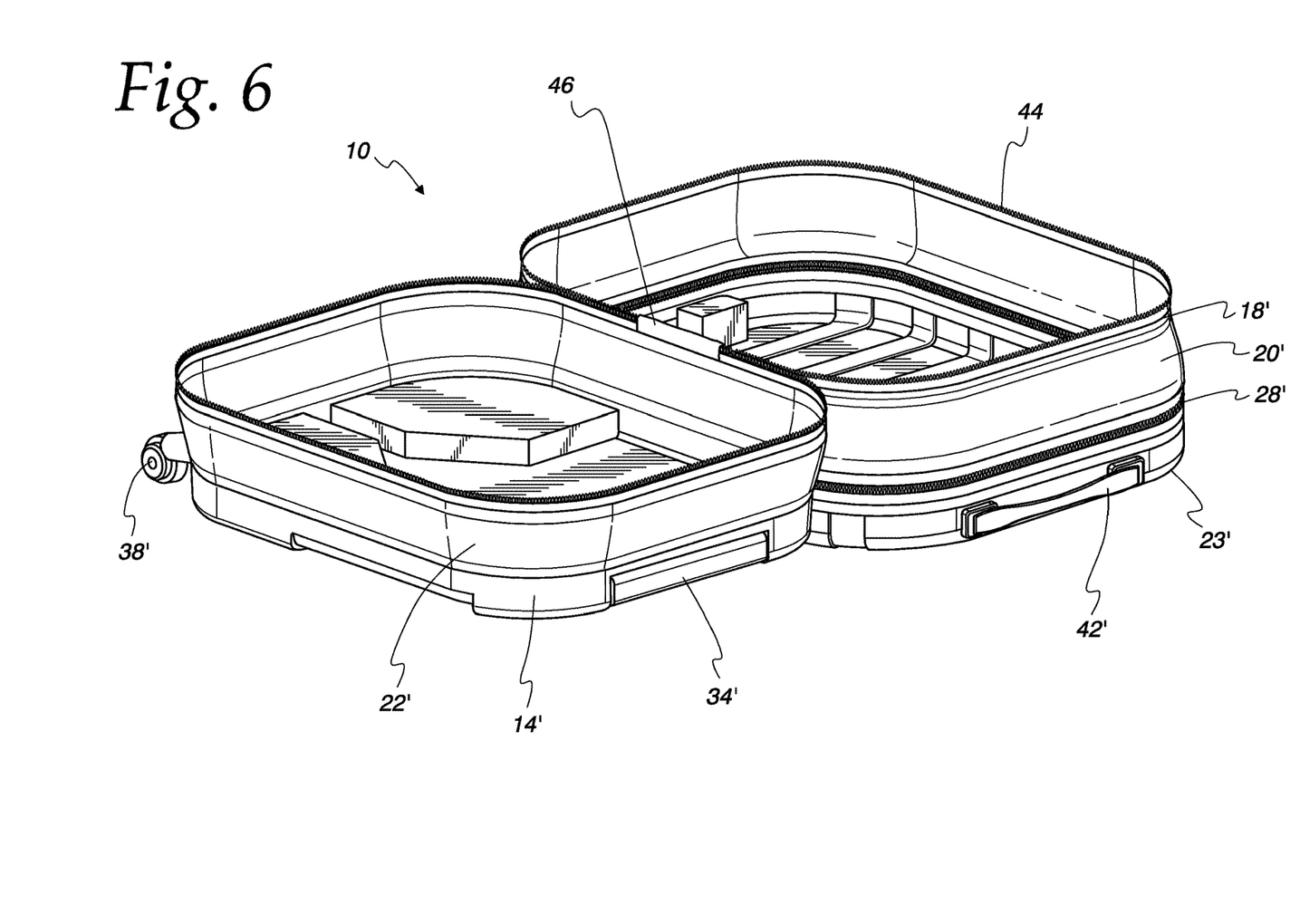
FIG. 6 is a perspective view of the suitcase of FIG. 4 with its middle zipper opened and its front half flipped open.
Figure 7:
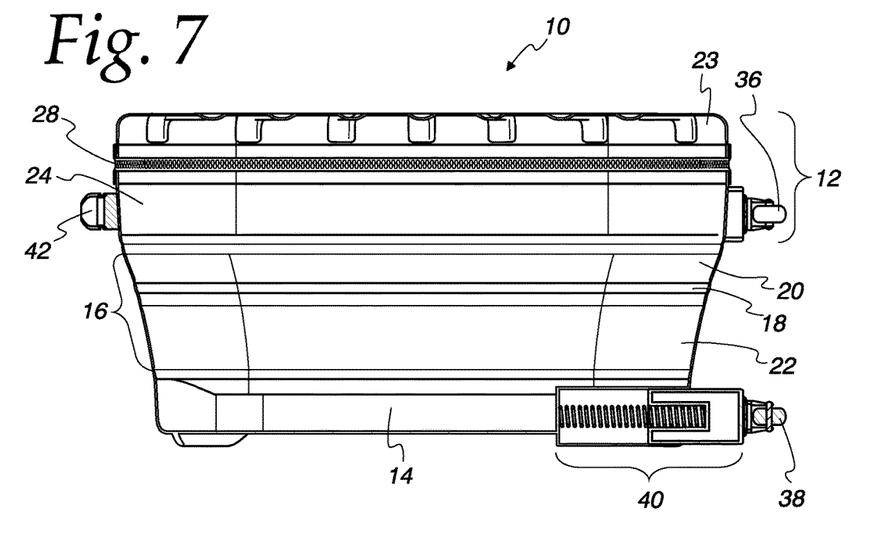
FIG. 7 is a sectional elevation view of the suitcase of FIG. 1 in an expanded state.

Turning to FIGS. 4-6, 9, 10, 13, and 14, an alternative embodiment of the invention is described and illustrated as a suitcase 10' which is substantially similar to suitcase 10, but in which a middle stiff or rigid tier 18' comprises two halves closeable by a middle zipper 44 and pivotally joined at a middle hinge 46 (which may for example simply be a piece of flexible material as illustrated), permitting suitcase 10' to be pivotally opened to the position depicted in FIG. 6. Suitcase 10' is shown as including both middle zipper 44 and a front zipper 28', but a front zipper could alternatively be omitted in a suitcase including a middle zipper. Although not shown in the Figures, both middle zipper 44 and front zipper 28' may be lockable by a suitable locking mechanism, which may for example be analogous to lock 30 of suitcase 10. Features of suitcase 10' that are similar to those of suitcase 10, so as to require no separate description, include a front panel 23', a back section 14', a foldable wall section 16', flexible tiers 20' and 22', a hinge 26' connecting front panel 23' to suitcase 10', the aforementioned front zipper 28', a retractable handle 34', casters 36' and 38', a retractable caster mounting assembly 40', and a carrying handle 42'. As illustrated in the drawings, suitcase 10' does not include an analogous feature to rigid front wall section 24 of suitcase 10, and casters 36' are instead attached directly to front panel 23', while front zipper 28' directly connects front panel 23' to flexible tier 20'. However, the omission of a rigid front wall section, to which a front panel is connected by a zipper, and to which casters are attached, is not strictly required by the incorporation of middle zipper 44. Rather, a suitcase including all of the features of suitcase 10, and differing from suitcase 10 essentially only by the addition of a middle zipper and a middle hinge within middle tier 18, would also be within the scope of the invention.

Suitcases 10 and 10' may be constructed of any suitable materials that impart relative rigidity to front section 12, 12' and back section 14, 14'; relative stiffness or rigidity to middle tier 18, 18', and relative flexibility to flexible tiers 20, 20' and 22, 22', while permitting the various components of suitcase 10, 10' to be durably attached to their neighboring components. For example, front section 12, 12', back section 14, 14', and/or a rigid version of middle tier 18, 18' may be composed of polypropylene, flexible tiers 20, 20' and 22, 22' being a thermoplastic elastomer overmolded onto the polypropylene. Alternatively, front section 12, 12', back section 14, 14', and/or a rigid version of middle tier 18, 18' may be composed of metal or nylon, flexible tiers 20, 20' and 22, 22' being a silicone material overmolded onto the metal or nylon with an adhesive glue between the two materials to strengthen their connection. Alternatively, a stiff but not rigid middle tier 18, 18' may be composed of the same material as flexible tiers 20, 20' and 22, 22', but with a greater thickness and/or a more vertical relaxed orientation than the flexible tiers, to impart to middle tier 18, 18' a greater resistance to deformation in general, and to folding in particular.

Figure 15:
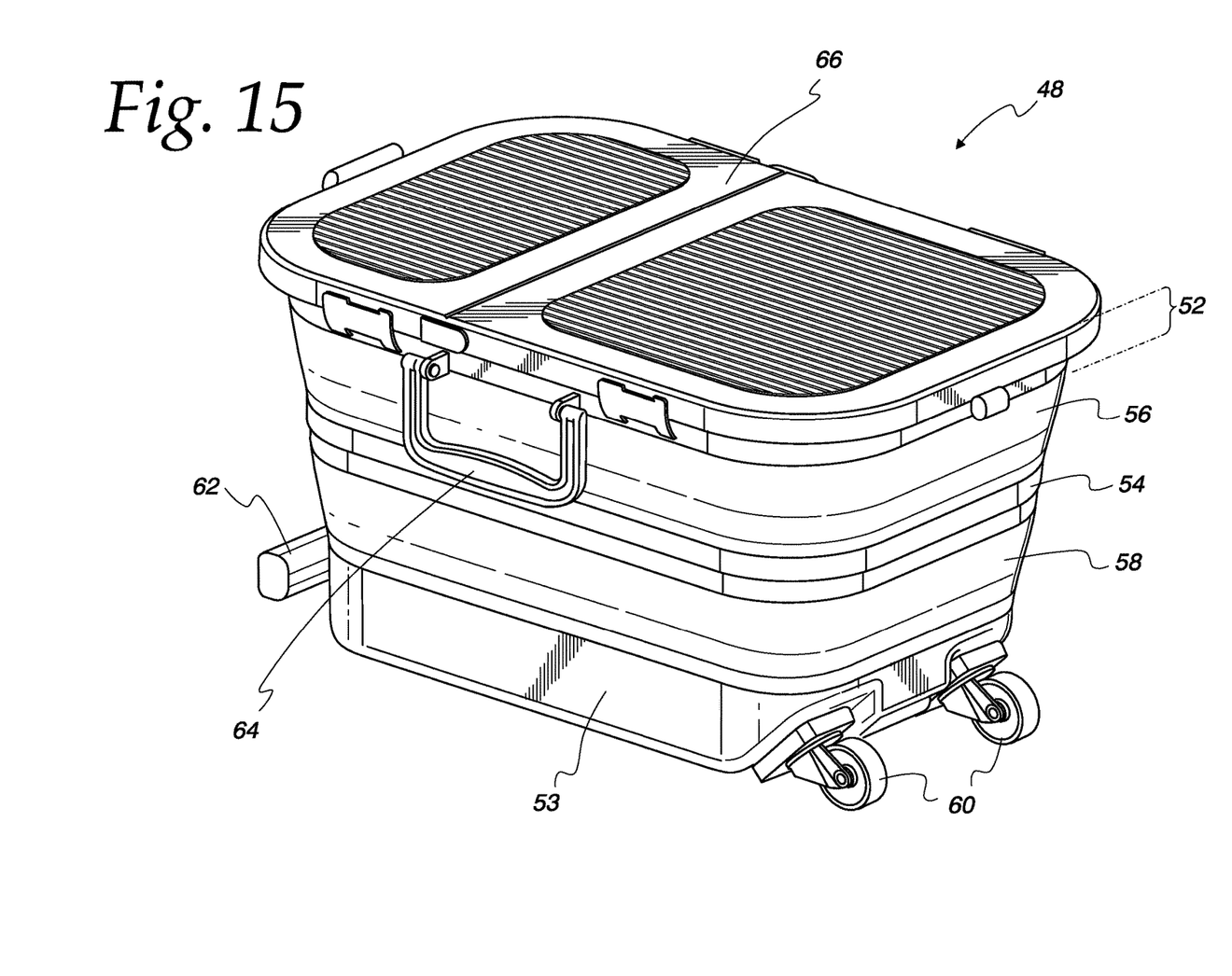
FIG. 15 is a perspective view of a trolley according to an aspect of the invention.

With reference to FIG. 15, a trolley 48 embodying another aspect of the invention is depicted. Similarly to suitcases 10 and 10', trolley 48 includes a hard top section 52, a hard bottom section 53a middle stiff or rigid tier 54 flexible tiers 56 and 58 interposed between the middle stiff or rigid tier 54 and the respective top and bottom sections, as well as casters 60 and a retractable handle 62 and/or pivoting handles 64 to facilitate its rolling transport. Trolley 48 is depicted as including flip-top lid 66, which may have snap-fit rims or close with clasps, instead of a zippered front panel as in suitcase 10. Lid 66 may flip open as a unit or in sections as desired. Lid 66 makes frequent access faster and more convenient than a zippered panel, by requiring only a single lifting motion to open. Thus, trolley 48 may be particularly suitable for uses as portable containers that demand frequent opening and closing, such as picnic containers/coolers, gardening or yard waste bins, water containers/coolers, garbage cans, laundry bins, a container for storing or hauling tools and/or appliances, or a container for miscellaneous items that may conveniently be transported in the trunk or rear of a car, such as groceries or other store-bought items.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A collapsible suitcase comprising
   a front section defining a front of the suitcase and a direction to the front;
   a back section defining a rear of the suitcase and a direction to the rear opposite said direction to the front, the back section being spaced to the rear of the front section, and the front section being spaced to the front of the back section; and
   a collapsible wall section connected between the front section and the back section, the wall section including at least three stacked, generally annular tiers extending around a perimeter of the suitcase;
   the collapsible wall section, front section, and back section cooperating to enclose a storage volume;
   at least one of the collapsible wall section tiers being a rigid tier composed of a rigid material, the rigid tier including an exposed outer surface of the rigid material facing away from the storage volume; and
   at least two of said collapsible wall section tiers being relatively flexible tiers configured to fold and unfold between relatively expanded and relatively collapsed positions while the rigid tier remains substantially vertical, including at least one flexible tier disposed to the front of the rigid tier and at least one flexible tier disposed to the rear of the rigid tier, the flexible material of the flexible tier disposed to the rear of the rigid tier being spaced apart from the flexible material of the flexible tier disposed to the front of the rigid tier wherein the flexible tiers are biased towards a folded position in the relatively collapsed positions and are biased towards an unfolded position in the relatively expanded positions.

2. The suitcase of claim 1, the front section comprising a front panel, a generally annular front wall section, a zipper and a pivotal joint, the zipper and the pivotal joint forming a generally annular connection between the front panel and the generally annular front wall section, so that when the zipper is opened, the front panel can be pivoted open to access the storage volume.

3. The suitcase of claim 1, the rigid tier being composed of a material selected from the group consisting of polypropylenes, metals, and nylons, and the flexible tiers being composed of a material selected from the group consisting of silicones and thermoplastic elastomers.

4. The suitcase of claim 1, wherein when the back section rests on a support surface in a substantially horizontal orientation in which the front section is above the back section, the at least two flexible tiers are self-supporting in the relatively extended position and in the relatively collapsed position.

5. The suitcase of claim 1, the at least one flexible tier being stable in a fully extended position, a fully collapsed position, and at least one partially extended position.

6. The suitcase of claim 1, the front and back sections being rigid.

7. The suitcase of claim 1, further comprising a plurality of casters disposed for engaging a generally horizontal surface to support the suitcase for rolling transport over the generally horizontal surface.

8. The suitcase of claim 1 wherein the collapsible wall section is at least partially located within the front section when the suitcase is in a collapsed state.

9. The suitcase of claim 1 wherein the collapsible wall when expanded and in a generally vertical orientation and extent is collapsible into a shorter vertical extent comprising two generally vertically extending spaced apart generally parallel segments connected to each other by a curved, folded portion of one of the flexible tiers.

10. A collapsible suitcase comprising
    a front section defining a front of the suitcase and a direction to the front;
    a back section defining a rear of the suitcase and a direction to the rear opposite said direction to the front, the back section being spaced to the rear of the front section, and the front section being spaced to the front of the back section;
    a collapsible wall section connected between the front section and the back section, the wall section including at least three stacked, generally annular tiers extending around a perimeter of the suitcase, the collapsible wall section, front section, and back section cooperating to enclose a storage volume, at least one of the collapsible wall section tiers being stiff, and at least two of said tiers being relatively flexible and configured to fold and unfold between relatively expanded and relatively collapsed positions while the stiff tier remains substantially upright, including at least one flexible tier disposed to the front of the stiff tier and at least one flexible tier disposed to the rear of the stiff tier; and
    a plurality of casters disposed for engaging a generally horizontal surface to support the suitcase for rolling transport over the generally horizontal surface, the plurality of casters including at least one retractable caster movable relative to the suitcase between an extended position for supporting the suitcase on the generally horizontal surface and a retracted position for permitting at least a portion of the collapsible wall section to move to a position blocking the movement of the retractable caster to the extended position by at least partially collapsing at least one flexible tier disposed between the stiff tier and the retractable caster.

11. The suitcase of claim 10, further comprising a handle mounted to be extended and retracted approximately in a plane defined by the back section, the handle being disposed generally opposite the casters, so that when the casters engage the generally horizontal surface, the handle extends generally upwardly and retracts generally downwardly.

12. The suitcase of claim 10 at least two of said tiers are self-supporting in the relatively expanded position when the at least two of said tiers extend substantially vertically with one tier above the other.

13. A method of making a collapsible suitcase, comprising
forming a rigid front section;
forming a rigid back section; and
forming a collapsible wall section connected to and cooperating with the front section and the back section to enclose a storage volume, the collapsible wall section comprising at least a first rigid middle tier composed of a rigid material, the rigid middle tier including an exposed outer surface of the rigid material facing away from the storage volume, a first flexible tier composed of a flexible material different from the rigid material and disposed between the middle tier and the front section, and a second flexible tier composed of a flexible material different from the rigid material and disposed between the middle tier and the back section, the flexible material of the first flexible tier being spaced apart from the flexible material of the second flexible tier, each flexible tier being adapted to fold between at least one relatively expanded position and at least one relatively collapsed position while the rigid tier remains substantially upright wherein the flexible tiers are biased towards a folded position in the relatively collapsed positions and are biased towards an unfolded position in the relatively expanded positions.

14. The method of claim 13, further comprising overmolding the first flexible tier onto the middle tier to connect the first flexible tier to the middle tier; and overmolding the second flexible tier onto the middle tier to connect the second flexible tier to the middle tier.

15. The method of claim 14, further comprising overmolding the first flexible tier onto the front section to connect the first flexible tier to the front section; and overmolding the first flexible tier onto the back section to connect the first flexible tier to the back section.

16. The method of claim 14, the middle tier being composed of a material selected from the group consisting of polypropylenes, metals, and nylons, and the flexible tiers being composed of a material selected from the group consisting of silicones and thermoplastic elastomers.

17. The method of claim 13, further comprising applying an adhesive material between the middle tier and at least one of the first flexible tier and the second flexible tier.

18. The method of making a collapsible suitcase of claim 13 wherein at least two of said tiers are self-supporting in the relatively expanded position when the at least two of said tiers extend substantially vertically with one tier above the other.

19. A collapsible suitcase comprising
a front section defining a front of the suitcase and a direction to the front;
a back section defining a rear of the suitcase and a direction to the rear opposite said direction to the front, the back section being spaced to the rear of the front section, and the front section being spaced to the front of the back section; and
a collapsible wall section connected between the front section and the back section, the wall section including at least three stacked, generally annular tiers extending around a perimeter of the suitcase;
the collapsible wall section, front section, and back section cooperating to enclose a storage volume, the front section comprising a front panel, a generally annular front wall section, a zipper and a pivotal joint, the zipper and the pivotal joint forming a generally annular connection between the front panel and the generally annular front wall section, so that when the zipper is opened, the front panel can be pivoted open to access the storage volume;
at least one of the collapsible wall section tiers being a rigid tier composed of a rigid material, the rigid tier including an exposed outer surface of the rigid material facing away from the storage volume; and
at least two of said collapsible wall section tiers being relatively flexible tiers configured to fold and unfold between relatively expanded and relatively collapsed positions while the rigid tier remains substantially vertical, including at least one flexible tier disposed to the front of the rigid tier and at least one flexible tier disposed to the rear of the rigid tier, the flexible material of the flexible tier disposed to the rear of the rigid tier being spaced apart from the flexible material of the flexible tier disposed to the front of the rigid tier.

20. The suitcase of claim 19 wherein the flexible tiers are biased towards a folded position in the relatively collapsed positions and are biased towards an unfolded position in the relatively expanded positions.

21. The suitcase of claim 19 at least two of said tiers are self-supporting in the relatively expanded position when the at least two of said tiers extend substantially vertically with one tier above the other.

* * * * *